June 12, 1951 J. M. DAY 2,556,840
HEATING SYSTEM
Filed Dec. 20, 1947 2 Sheets-Sheet 1

INVENTOR
JOSEPH M. DAY.
BY Joseph Shea
ATTORNEY

INVENTOR
JOSEPH. M. DAY.
BY Joseph Shea
ATTORNEY

Patented June 12, 1951

2,556,840

UNITED STATES PATENT OFFICE 2,556,840

HEATING SYSTEM

Joseph M. Day, West Haven, Conn., assignor to American Machine & Foundry Company, a corporation of New Jersey Application December 20, 1947, Serial No. 792,905

7 Claims. (Cl. 107—63)

This invention relates to bakery ovens, more particularly to heating systems of the recirculating type.

One of the main objects of this invention is to provide an improved heating system which will have a substantially greater heating surface without material addition to cost by making the necessary return ducts serve as an additional flue or radiating surface. Heretofore in recirculating heating system for bakery ovens the return duct returning the flue gases to the combustion chamber was commonly located outside the insulated walls of the oven. This was found necessary because the return duct as hitherto used extended longitudinally of the oven along one side thereof and would therefore overheat the baked goods on that side of the oven if located within the oven, unless insulated at considerable expense.

Moreover, even though the return duct is insulated when located inside the oven, the side of the oven along which it extends will be overheated. If the return duct is located outside the oven there will be an appreciable loss of heat even though it is insulated.

Applicant has found that in travelling ovens the return duct can be made a useful heat radiating element, and the above unbalanced condition avoided, by rearranging the return duct work and circulating means so that the uninsulated return duct extends horizontally from one corner of the radiator to the diagonally opposite corner of the radiator. Thus the travelling support for the baked goods is uniformly heated while traversing the radiator. Moreover, 10-12% more heating surface is obtained than with prior heating systems. With prior heating systems, for certain sizes of ovens, it was necessary to use a pair of heating systems to obtain the desired baking conditions. With my heating system the additional heating surface obtained from the improved arrangement of the return duct permits creation of the desired baking conditions in these sizes of ovens with a single heating system. A further object of the invention, therefore, is to more evenly heat the products to be baked within the oven. It will be noted that with my diagonal return duct the goods, which are conveyed longitudinally of the heating system by the trays, will be evenly heated and the return duct will have become a useful radiating element taking the place of a certain number of flues, instead of a source of heat unbalance and waste.

Figure 1:
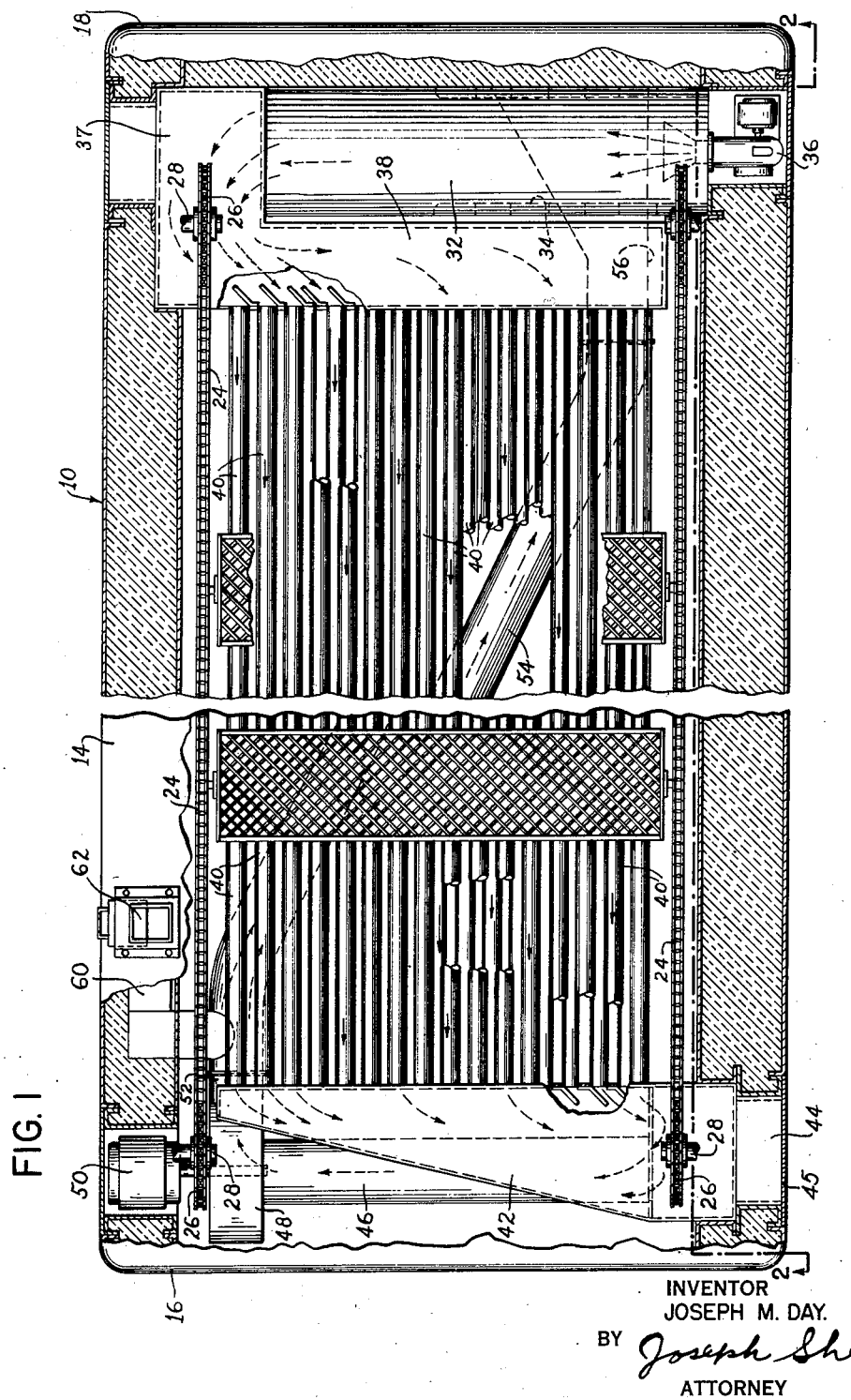
Figure 2:
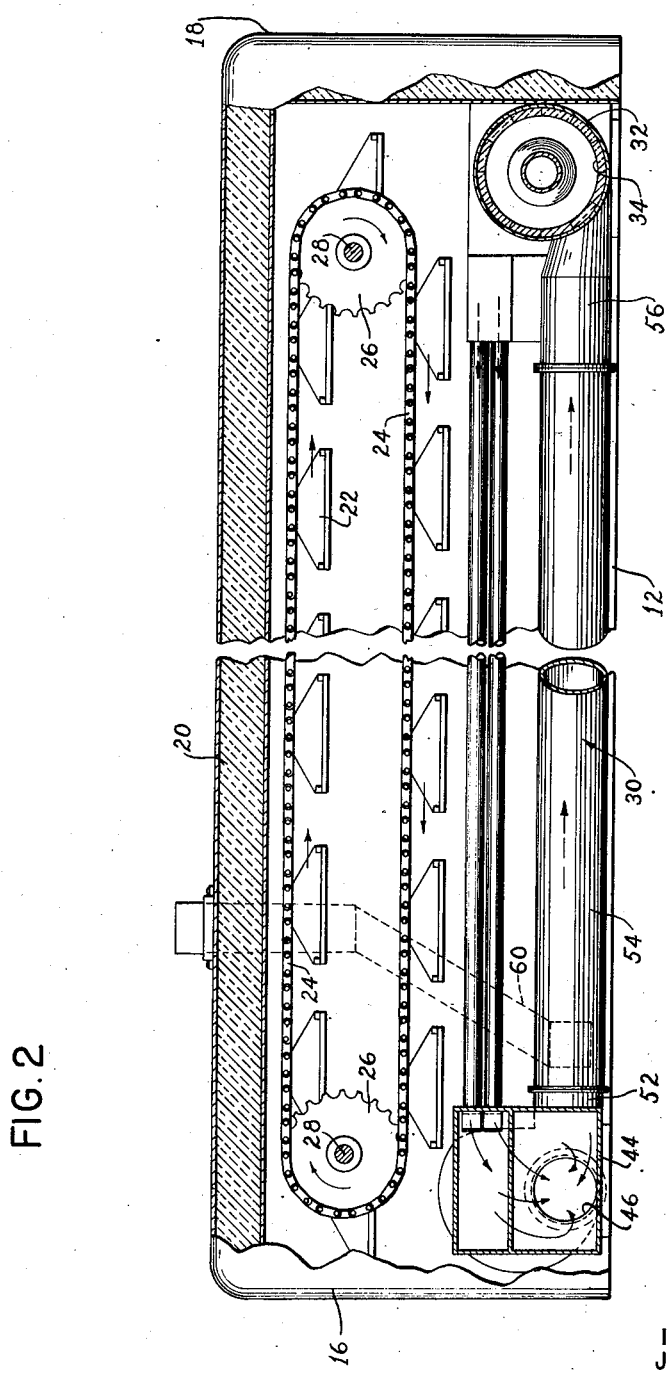

In the accompanying drawings which form a part of this specification:

Fig. 1 is a plan view of an oven provided with my improved heating system, the top of the oven being broken away to expose the heating system; and Fig. 2 is a longitudinal sectional view of the same taken on the line 2—2 of Fig. 1.

Referring to the drawings it will be observed that the oven 10 is provided with a base 12 which may rest on the floor of the bakery. The oven 10 also has side walls 14 and end walls 16 and 18 which may be suitably insulated, as shown in Fig. 1, and a top wall 20 also suitably insulated, as shown in Fig. 2. Since the construction of these walls forms no part of the present invention, further description thereof is deemed unnecessary.

The front end wall 16 is provided with a door (not shown) through which pans containing the goods to be baked may be inserted and positioned on the trays 22. These trays may be pivotally supported on a conveyor consisting of conveyor chains 24 running over sprockets 26 mounted on shafts 28 suitably supported in the side walls 14 of the conveyor.

The pans positioned on the trays 22 will be advanced in an endless path from the door along the heating system 30 whereby the goods in the pans are baked and returned to the door for removal from the trays. The heating system 30, which is of the recirculating type, rests on the base 12 and may include a cylindrical combustion chamber 32 lined with suitable refractory material 34. A burner 36 of conventional construction is mounted in one of the side walls 14 and is supplied with air and a suitable fuel which are delivered to the interior of the combustion chamber 32 wherein the fuel is burned. The hot combustion gases issuing from the combustion chamber pass through a duct 37 into the intake header 38 of the radiator of the heating system. The intake header 38 is connected to one end of a series of flues or pipes 40 whose other end communicates with the exhaust header 42. The hot combustion gases flow through the intake header 38 and flues 40 into exhaust or return header 42. One end of the exhaust header 42 is closed and its other end communicates with a relief chamber 44. The chamber 44 extends through the side wall 14 and is provided with a plate 45 mounted thereon in a conventional manner whereby said plate will be blown out in case of an explosion in the heating chamber.

A pipe 46 connects the relief chamber 44 to a fan housing 48 wherein is mounted an exhaust fan (not shown) which is of conventional construction and is driven by an electric motor 50 mounted in one of the side walls 14.

The exhaust fan sucks the combustion gases, which have now cooled considerably from the pipe 46 and impels them through the outlet 52 of the fan housing into the return duct 54. Return duct 54 extends diagonally of the heating system and the oven, and communicates with an intake 56 communicating with the interior of the combustion chamber 32. Since the construction of the combustion chamber and its intake may be of any well known type and forms no part of my invention, further description thereof is deemed unnecessary.

The portion of return duct 54 adjacent fan housing 48 is connected to a vent pipe 60 extending upwardly through the top wall 20 of the oven. A valve plate 62 of conventional construction and slidably mounted in the outer end of pipe 60 may be closed or opened to regulate the amount of combustion gases which will be vented from the heating system into the atmosphere outside the oven. Thus the amount of the combustion gases returned through duct 54 to the combustion chamber to be recirculated in the heating system may be controlled to suit different requirements in the operation of the heating system.

Since the return duct 54 extends diagonally of the heating system and the oven, the goods on the trays 22 will be uniformly heated and baked as they are advanced in an endless path above the heating system by reason of the fact that all portions of the tray across its greatest dimension are successively subjected to the extra heating effect of the diagonal return duct.

Moreover, the return duct 54, the fan housing 48 and all other parts of the heating system are enclosed within the oven. Therefore, a considerably greater heating surface for baking is obtained which may be 10-12% greater than with prior heating systems of the recirculating type whose return ducts were located outside the oven. Moreover, my heating system will not require any insulation, as it is enclosed entirely within the oven.

As many changes could be made in the above construction, and many apparently widely different embodiments of this invention could be made without departing from the scope of the claims, it is intended that all matters contained in the above description or shown in the accompanying drawings shall be interpreted as illustrative and not in a limiting sense.

What is claimed is:

1. A heating system of the recirculating type comprising a combustion chamber wherein a mixture of fuel and air is burned to provide a source of hot combustion gases, an intake header connected to said combustion chamber to receive the hot combustion gases therefrom, a return header, a plurality of flues connecting said intake header to said return header and adapted to conduct the hot combustion gases to said return header, a fan housing connected to one end of said return header and arranged adjacent the other end of said return header, and a return duct connected to said fan housing and extending diagonally across said flues and connected to said combustion chamber to return the combustion gases to said combustion chamber for recirculation in the heating system.

2. A heating system of the type which is entirely enclosed in an oven, said heating system including a combustion chamber located inside said oven wherein a mixture of fuel and air is burned to form a source of supply of combustion gases, an intake header inside of and extending transversely of the oven and connected to said combustion chamber to receive the hot combustion gases therefrom, a return header inside of and extending transversely of the oven, a plurality of flues inside of and extending longitudinally of the oven and connecting said headers and adapted to conduct the hot combustion gases from the intake header to the return header, a fan housing within said oven and connected to receive said return header to receive the combustion gases therefrom, and a diagonal return duct inside of the oven and connected to said fan housing and extending diagonally across said flues and connected to said combustion chamber to conduct the combustion gases from the fan housing to said combustion chamber for recirculation in the heating system.

3. A heating system of the type which is entirely enclosed in an oven, said heating system including a combustion chamber enclosed in said oven wherein a mixture of fuel and air is burned to provide a supply of hot combustion gases, a horizontal radiator having one end thereof connected to said combustion chamber to receive the hot combustion gases therefrom and adapted to heat the interior of said oven to bake goods located therein, and a diagonal return duct connected to the other end of said radiator and extending diagonally across said radiator and connected to said combustion chamber to return the combustion gases to the combustion chamber for recirculation in the heating system whereby the interior of the oven will be uniformly heated.

4. A heating system comprising a combustion chamber wherein a mixture of fuel and air is burned to provide a source of supply of hot combustion gases, an elongated rectangularly arranged radiator having one end thereof connected to said combustion chamber to receive hot combustion gases therefrom, said radiator being adapted to heat space adjacent thereto, and a return duct connected to the other end of said radiator and extending diagonally across said radiator and adapted to conduct the combustion gases to the combustion chamber for recirculation in the heating system to balance the distribution of heat from said duct across the width of said radiator over the length thereof.

5. A heating system for use with an oven of the type having a travelling member having its width extending transversely of said oven and adapted to convey longitudinally of said oven the goods to be baked, said heating system comprising a radiator within said oven and extending across substantially the entire width of said travelling member to heat the goods supported thereon, a combustion chamber wherein a mixture of fuel and air is burned to provide a supply of hot combustion gases, said combustion chamber being connected to one end of said radiator, and a return duct connected to the other end of said radiator and extending diagonally across substantially the entire width of said member and connected to said combustion chamber to return combustion gases thereto for recirculation through the radiator, while distributing heat from said return duct uniformly across said travelling member.

6. An oven heating system for use with an oven wherein articles to be baked are conveyed in transverse rows along the length of the oven, said heating system comprising, a generally horizontal radiator system within said oven enclosure having flues extending longitudinally along the direction of travel of said conveyor, said flues being arranged side by side across substantially the entire width of said conveyor to heat the goods supported thereon, a combustion chamber, means connecting said combustion chamber to one end of said flues to deliver hot gases thereto, means collecting spent flue gases from the other end of said flues, and an uninsulated return duct within said enclosure receiving the spent flue gases from said collecting means and extending from one corner of said radiator system to a non-adjacent corner of said radiator system to return said flue gases to said combustion chamber for reheating and recirculation, to provide an additional heating flue operating to heat the conveyor uniformly across its width as the conveyor travels longitudinally of the flues.

7. An oven heating system for use with an oven enclosure employing a travelling conveyor in said enclosure having its width extending transversely of said oven and adapted to convey longitudinally of said oven the goods to be baked, said heating system comprising a generally horizontal radiator system within said oven and extending longitudinally along the direction of travel of said conveyor and across substantially the entire width of said conveyor to heat the goods supported thereon, a combustion chamber, means connecting said combustion chamber to one end of said radiator system to deliver hot gases thereto, means collecting spent flue gases from the other end of said radiator system, and an uninsulated return duct within said enclosure receiving the spent flue gases from said collecting means and extending from one corner of said radiator system to a non-adjacent corner of said radiator system to return said flue gases to said combustion chamber for reheating and recirculation, to provide an additional heating flue operating to heat the conveyor uniformly across its width as the conveyor travels longitudinally of the radiator system.

JOSEPH M. DAY.

REFERENCES CITED

The following references are of record in the file of this patent:

UNITED STATES PATENTS

| Number | Name | Date |
| --- | --- | --- |
| 1,857,447 | Engels | May 10, 1932 |
| 2,041,930 | Houlis | May 26, 1936 |
| 2,189,167 | Cook | Feb. 6, 1940 |